United States Patent
Raynaud et al.

(10) Patent No.: US 6,168,424 B1
(45) Date of Patent: Jan. 2, 2001

(54) INSTALLATION FOR THERMAL TREATMENT OF SUSPENDED POWDER SUBSTANCES, AND USE FOR FLASH CALCINING OF MINERAL, IN PARTICULAR CLAYEY, SUBSTANCES

(75) Inventors: Gilbert Raynaud, Muret; Olivier Pons, Toulouse; Pierre Valmalette, Muret; Sylvain Salvador, Albi, all of (FR)

(73) Assignee: Demeter Technologies, Toulouse Cedex (FR)

( * ) Notice: Under 35 U.S.C. 154(b), the term of this patent shall be extended for 0 days.

(21) Appl. No.: 09/445,305

(22) PCT Filed: Jun. 5, 1998

(86) PCT No.: PCT/FR98/01149

§ 371 Date: Dec. 30, 1999

§ 102(e) Date: Dec. 30, 1999

(87) PCT Pub. No.: WO98/55418

PCT Pub. Date: Dec. 10, 1998

(30) Foreign Application Priority Data

Jun. 5, 1997 (FR) .................................................. 97 06971

(51) Int. Cl.[7] ...................................................... F27B 15/02
(52) U.S. Cl. ................................. 432/15; 432/58; 404/75; 106/773
(58) Field of Search ................................. 432/15, 18, 58; 404/75, 76; 106/747, 773

(56) References Cited

U.S. PATENT DOCUMENTS

| | | | |
|---|---|---|---|
| 3,870,534 | * 3/1975 | Van Dornick | 432/15 |
| 4,169,701 | * 10/1979 | Katayama et al. | 432/58 |
| 4,321,238 | 3/1982 | Henin | 432/14 |
| 4,354,825 | * 10/1982 | Fisher et al. | 432/15 |
| 4,402,754 | * 9/1983 | Schmidt et al. | 432/15 |
| 4,416,622 | 11/1983 | Touborg | 432/14 |
| 4,668,182 | 5/1987 | Cohen | 432/58 |
| 5,343,631 | * 9/1994 | Shackelford et al. | 432/58 |
| 5,775,890 | * 7/1998 | Olbye et al. | 432/58 |

FOREIGN PATENT DOCUMENTS

| | | |
|---|---|---|
| 0 498 731 | 8/1992 | (EP) . |
| 2 510 984 | 2/1983 | (FR) . |

OTHER PUBLICATIONS

S. Salvador, Pozzolanic Properties of Flash–Calcined Kaoli–nite: A Comparative Study with Soak–Calcined Products, *Cement and Concrete Research*, vol. 25, No. 1, 1995, pp. 102–112.

R. C. T. Slade, "Evolution of Structrural Changes During Flash Calcination of Kaolinite" *J. Mater. Chem.*, vol. 1, No. 3, 1991, pp. 361–364.

R. C. T. Slade, Flash Calcines of Kaolinite: Effect of Process Variables on Physical Characteristics, *Journal of Materials Science*, vol. 27, 1992, pp. 2490–2500.

S. Salbador, Prototyping Flash Calciners for the Manufacture of Synthetic Pozzolana From Kaolinite Clay, *Flash Reaction Processes, NATO ASI Series, Series E: Applied Sciences*, vol. 282, 1995, pp.295–318.

* cited by examiner

*Primary Examiner*—Denise L. Ferensic
*Assistant Examiner*—Gregory A. Wilson
(74) *Attorney, Agent, or Firm*—Young & Thompson (57) ABSTRACT

An installation for quick thermal treatment of suspended powder substances, in particular for flash calcining of mineral substances, comprises modules advantageously arranged in mobile units including elements for supplying powder substances, a combustion chamber wherein the substances are introduced suspended in a hot air flux and a cooling assembly where the calcined substances are recuperated to pre-heat the combustion air. The substances are pneumatically transported in the heated air downstream of the supplying elements, via a pre-heating device up to the combustion chamber.

17 Claims, 4 Drawing Sheets

INSTALLATION FOR THERMAL TREATMENT OF SUSPENDED POWDER SUBSTANCES, AND USE FOR FLASH CALCINING OF MINERAL, IN PARTICULAR CLAYEY, SUBSTANCES

FIELD OF THE INVENTION

The invention concerns an installation for the rapid heat treatment of suspended powdered materials, in particular for the flash calcination of mineral materials. ("Powdered" is hereinafter understood to denote a material being in a divided state which is capable of being suspended in a gas flow). It applies in particular to the calcination of clay-bearing materials with a view to preparing a binder for stabilizing soil on a road construction site.

BACKGROUND OF THE INVENTION

Traditional installations for carrying out heat treatment, in particular calcination of mineral materials, operate in a fixed bed and/or a long cycle, for example in the cement-making sector where the calcination of materials takes several hours. In order to improve heat exchanges and to reduce firing times, certain installations have been adapted to work in a fluidized bed but the operating and firing parameters are difficult to control, in particular for certain materials with heterogeneous particles. All these installations are heavy and very bulky installations in which heat treatment is linked to production capacity.

Another method of calcining powdered materials is also known, often designated as "flash calcination" which consists of heat treating suspended materials over very short periods, by passing them through a combustion chamber in an airflow which carries them in the chamber and serves as an oxidant. This method of flash calcination is currently often used in cement works in order to ensure the precalcination of materials, but corresponding industrial installations remain very bulky, in particular as regards their height, on account of the accumulation of the necessary stages inside which the materials descend by gravity from the point at which they are fed at the top until they leave at the bottom (U.S. Pat. Nos. 4,321,238, 4,416,622, 4,668,182). These installations do not lend themselves to a reduction in size and bulk.

The flash calcination process (or more generally the process consisting of subjecting suspended materials to a rapid heat treatment) could have considerable value in many applications, in particular for activating clay-bearing materials (in particular to obtain a metakaolin) with a view to manufacturing a hydraulic binder which can be used in a road application, in a low-cost construction, in "small civil engineering works" etc. (cf. in particular the following publications: "Pozzolanic properties . . . with soak-calcined products", S. SALVADOR, Cement and Concr. Res. 25 (1995) 102–112"; "Evolution of structural changes during flash calcination of kaolinite", SLADE and DAVIES—J MATER—Chem.1991—1(3)—361–364; "Flash calcines of kaolinite: effect of process variables on physical characteristics", SLADE et al., JOURNAL OF MATERIALS SCIENCE 27(1992)2490–2500; "Phototyping flash calciners for the manufacture of synthetic pozzolana from kaolinite clay" SALVADOR S., Flash Reaction Processes, 295–318, T. W. Davies(ed)., 1995 Kluwer Academic Publishers. Printed in the Netherlands, NATO ASI Series, Series E: Applied Science—vol.282). It is however desirable, for these applications, to make use of installations with a moderate capacity and small bulk, more particularly in road construction techniques or in a mobile or semi-mobile installation which would enable clays to be treated on site and which would enable the installation to move as the construction site advances.

SUMMARY OF THE INVENTION

The object of the present invention is to provide an installation for the rapid heat treatment of suspended powdered materials, of which the structure lends itself to changes in scale compared with known installations and equally well enables installations with small overall size to be constructed having small or moderate capacities (1 to 10 tonnes/hour) as well as installations with high capacities benefiting from a smaller overall size than those of known flash calcination installations.

"Rapid heat treatment" is understood to mean a treatment with a duration of the order of a few seconds to a few tens of seconds, this heat treatment being designated as "flash calcination" in the particular case where powdered materials undergo a mineralogical transformation.

One objective of the invention is in particular to enable mobile installations to be constructed which are easily transportable on a road jig.

Another object is to provide installations benefiting from a high degree of operating flexibility, with in particular a low starting and stopping inertia, which lends itself as required to daily operation during the hours of activity on a construction site.

Another objective is to provide installations benefiting from very good thermal yield, even in the case of small size or very small size installations and those with a small capacity (less than 5 tonnes/hour for example).

To this end, the installation according to the invention for heat treating suspended powdered materials comprises:

means for feeding in powdered materials, a device for preheating the materials, provided with an inlet for hot gases, an outlet for the preheated materials and a gas outlet, a combustion chamber containing at least one burner and provided with an inlet for introducing reheated air and preheated powdered materials, and an outlet for fumes containing the materials after passage through the chamber, a separator provided with an inlet receiving the fumes and powdered materials coming from the combustion chamber, a fume outlet connected to the inlet for hot gases of the preheating device, and an outlet for powdered materials, an assembly for cooling the materials, provided with an inlet for powdered materials coming from the separator, an inlet for fresh air, so-called principal air, an outlet for cooled materials and a reheated principal air outlet, at least two conduits connected to the reheated principal air outlet of the cooling assembly with a view to dividing the reheated principal air into two flows, one referred to as reheated air and the other as diverted air, the reheated air conduit being provided with an inlet for materials connected to the preheated materials outlet of the preheating device, with a view to introducing the said materials into the said conduit, and being connected to the reheated air inlet of the combustion chamber with a view to injecting the said materials into the said combustion chamber, the installation extending vertically between a lower level Ni and an upper level Ns, wherein the diverted air conduit, the so-called by-pass conduit, includes a section descending from the reheated principal air outlet to the lower level of the installation, is connected to means of supply by a powdered material inlet in the vicinity of the said lower level with a view to receiving the powdered materials, and includes a section rising towards the fume outlet of the separator to form therewith a common conduit connected to the hot gas inlet of the preheating device, with a view to providing pneumatic transport for the said powdered materials from the level Ni and a first reheating of these upstream from the said preheating device.

The installation according to the invention uses the principle of flash calcination by introducing into the combustion chamber powdered materials suspended in part of the combustion air. This air comes from the principal air flow which is reheated in the cooling assembly by recovering heat liberated in this assembly. The diverted air, also reheated, which is conveyed in the by-pass conduit, conveys the powdered materials pneumatically to the preheating device (these materials are therefore able to enter at the lower part of the installation so as to avoid additions to the height) while providing a first reheating of the said materials. These materials thus undergo preheating at the same time by virtue of the heat from the fumes coming from the combustion chamber and the residual heat of the air diverted by the by-pass conduit. An excellent thermal yield is obtained in this way while profiting to the greatest extent from the advantages of flash calcination (or more generally from rapid heat treatment of the suspended materials). Tests have shown that such an installation makes possible excellent control over the treatment parameters for small or moderate installations (corresponding to treatment capacities of less than 1 tonne/hour).

The installation according) to the invention may in particular be constructed so as to have an overall height (height between the lower level Ni and the upper level Ns of the installation) very much less than the sum of the heights of the different functional assemblies: means of supply, preheating device, combustion chamber, cooling assembly. The reheated principal air outlet of the cooling assembly as well as the fume outlet from the separator are preferably situated at an intermediate level or close to the upper level. The by-pass conduit which diverts a fraction of the reheated air into the cooling assembly, conveys powdered materials from the material inlet (which is situated close to the lower level by virtue of the shape of the by-pass conduit) to the preheating device situated preferably close to the upper level. This preheating device may thus be disposed, on the one hand, above the principal reheated air outlet of the cooling assembly (so that the materials coming from this preheating device are directly diverted in the reheated air coming from the cooling assembly) and, on the other hand, above the level of the combustion chamber (so as to limit the length of the reheated air conduit and, consequently, heat losses).

According to a preferred embodiment, the by-pass conduit includes, between its descending section and its ascending section, an elbow extending along a regular curve and having a minimum cross section close to its lower part. This elbow advantageously has a section progressively decreasing upstream from the said minimum section and a section increasing progressively downstream from the said minimum section. In addition, it preferably possesses a detachable wear plate extending either side of its minimum section. The pneumatic conveyance of powdered materials is thus achieved under the best conditions, by avoiding material deposits in the lower parts and by limiting pressure losses. Moreover, in the case of relatively abrasive materials, changing the wear plate makes it possible to preserve the performances of the installation rapidly and at least cost.

In addition, according to another advantageous feature of the invention, the combustion chamber is extended by a heat treatment tube connected to the outlet from the said chamber to receive the fumes and powdered materials after passage through this, the said tube being connected at its terminal end to the inlet of the separator. This tube, through which fumes and materials pass during treatment, makes it possible to extend the heat treatment duration, while keeping reduced dimensions for the combustion chamber. It additionally makes it possible to be free of an imposed relative arrangement between the combustion chamber and separator. The latter may thus be easily arranged in the installation so that the material outlet supplies the cooling assembly by gravity.

The heat treatment tube indicated above may advantageously have the form of a swan neck including, between a descending section and an ascending section, an elbow extending along a regular curve and having a minimum cross section close to its lower part. This elbow preferably has a section which decreases progressively upstream from the said minimum section and a section which increases progressively downstream from the said minimum section. In the same way as with the aforementioned by-pass conduit, the elbow of the heat treatment tube may include a detachable wear plate extending either side of its minimum section.

In a known manner, the means for supplying powdered materials may include on the one hand, a grinder/drier adapted so as to deliver materials with a particular particle size and degree of humidity and, on the other hand, a buffer-silo interposed between the outlet from the said grinder/drier and the materials inlet through which these are discharged in the by-pass conduit. The grinder/drier ensures that the crude materials are formed, in particular on the construction site, with a view to having these materials available in the optimum state for undergoing heat treatment, although the buffer-silo gives the installation a high degree of operating flexibility in the transitory phases (starting and stopping). The grinder/drier may be fed with hot gases by the preheating device so as to increase the overall heat yield of the installation. The buffer-silo makes it possible in particular to offset the starting or stopping of the grinder/drier and the burner of the combustion chamber with time so as to reduce the duration of the transitory phases.

The installation according to the invention may be provided with any supplementary device known per se, making it possible to adapt it to the application envisaged, in particular, where appropriate, a dust removal unit associated with the grinder/drier for recovering fines before the gases are discharged from the outlet and/or a fines recovery unit associated with the preheating device for recovering fines in the fumes coming from the latter so as to reduce the circulating charge (these already treated fines being directly conveyed into the final product at the outlet from the cooling assembly).

By virtue of its reduced height, the installation according to the invention lends itself to a division into juxtaposed modules which are separable and which can be assembled. Each of these modules is provided with a frame which may be fixed on a trailer provided with means of rolling motion so as to make it mobile. Accordingly, on a construction site, it is possible to disassemble the modules in a few hours and to convey them to a new site and to assemble them once again so that the installation can be used on the optimum location of the construction site.

Particularly on a road construction site, the installation according to the invention makes it possible in particular to use the following process for soil stabilization in situ: natural crude clay-bearing earths are extracted close to the site, the said earths are treated (drying, calcination) by means of an installation such as defined previously with a view to obtaining an activated clay-bearing material and the said activated clay-bearing material is incorporated in the soil in a mixture with lime and water under conditions suitable for producing hydraulic setting. Such a process makes it possible to construct sites, in particular road construction sites, under noteworthy conditions of profitability by reason of the considerable reduction in transport costs (on the crude material and hydraulic binder) and a production adapted to the rate of advance of the site (reduction of stocks).

The installation according to the invention may be mobile as indicated previously. It may also be provided fixed and situated in particular close to an industrial works, in particular in the case where a byproduct from the said works is to be treated by calcination (or more particularly by a rapid heat treatment) in order to make use of it and to transform it.

BRIEF DESCRIPTION OF THE DRAWINGS

The following description with reference to the accompanying drawings shows, in a non-limiting manner, one embodiment of an installation according to the invention, adapted so as to form metakaolins from clay-bearing earths collected close to a road construction site. In these drawings.

DETAILED DESCRIPTION OF THE INVENTION

Figure 1:
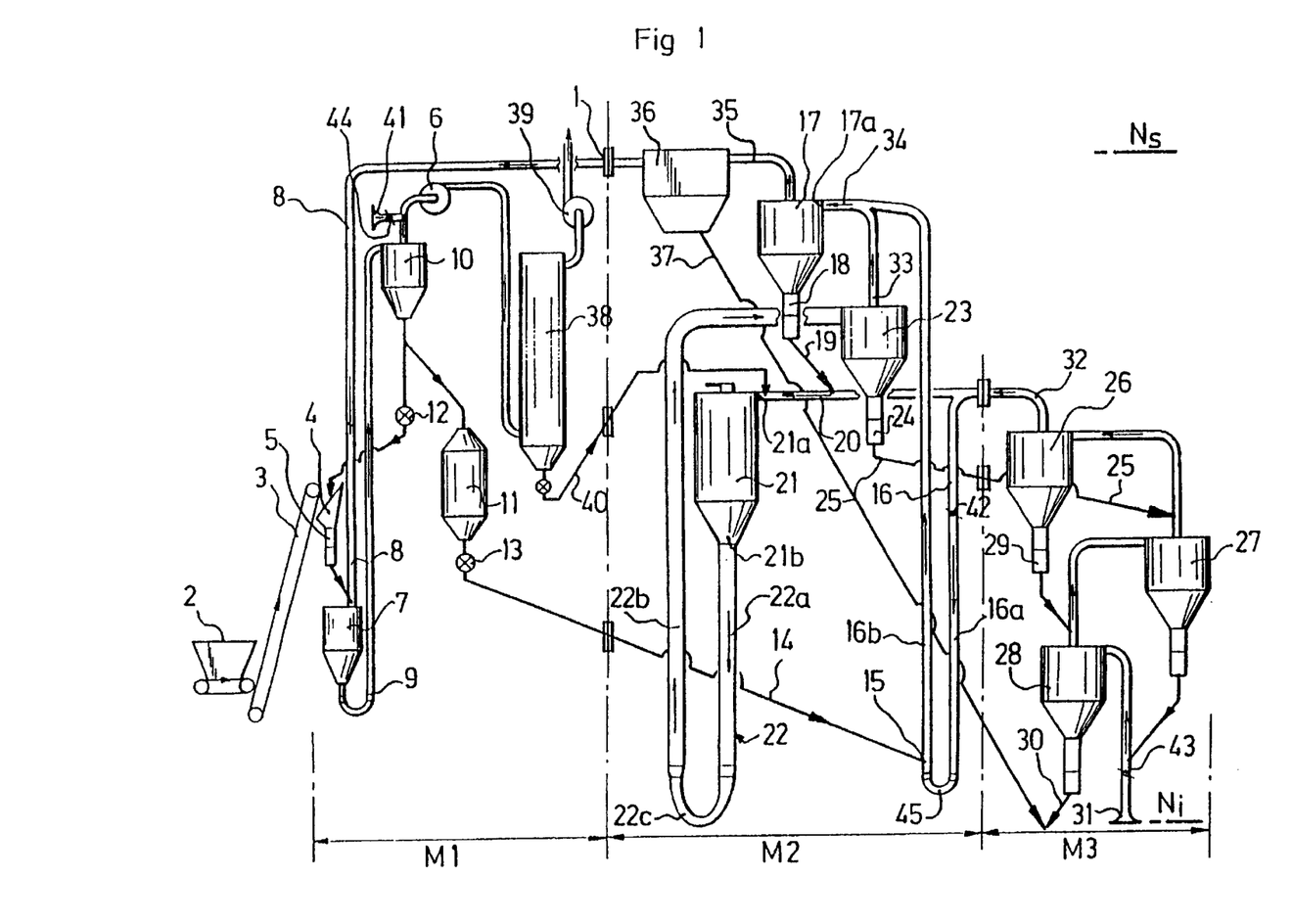
FIG. 1 is a diagram of the said installation.

The installation represented by way of example in FIG. 1 comprises three principal modules M1, M2, M3, which are associated in a working configuration with auxiliary modules such as the means for bringing in materials, an electrical generator for supplying electricity (not shown) a control unit (not shown), and a silo for storing the finished products (not shown in FIG. 1).

Figure 5:
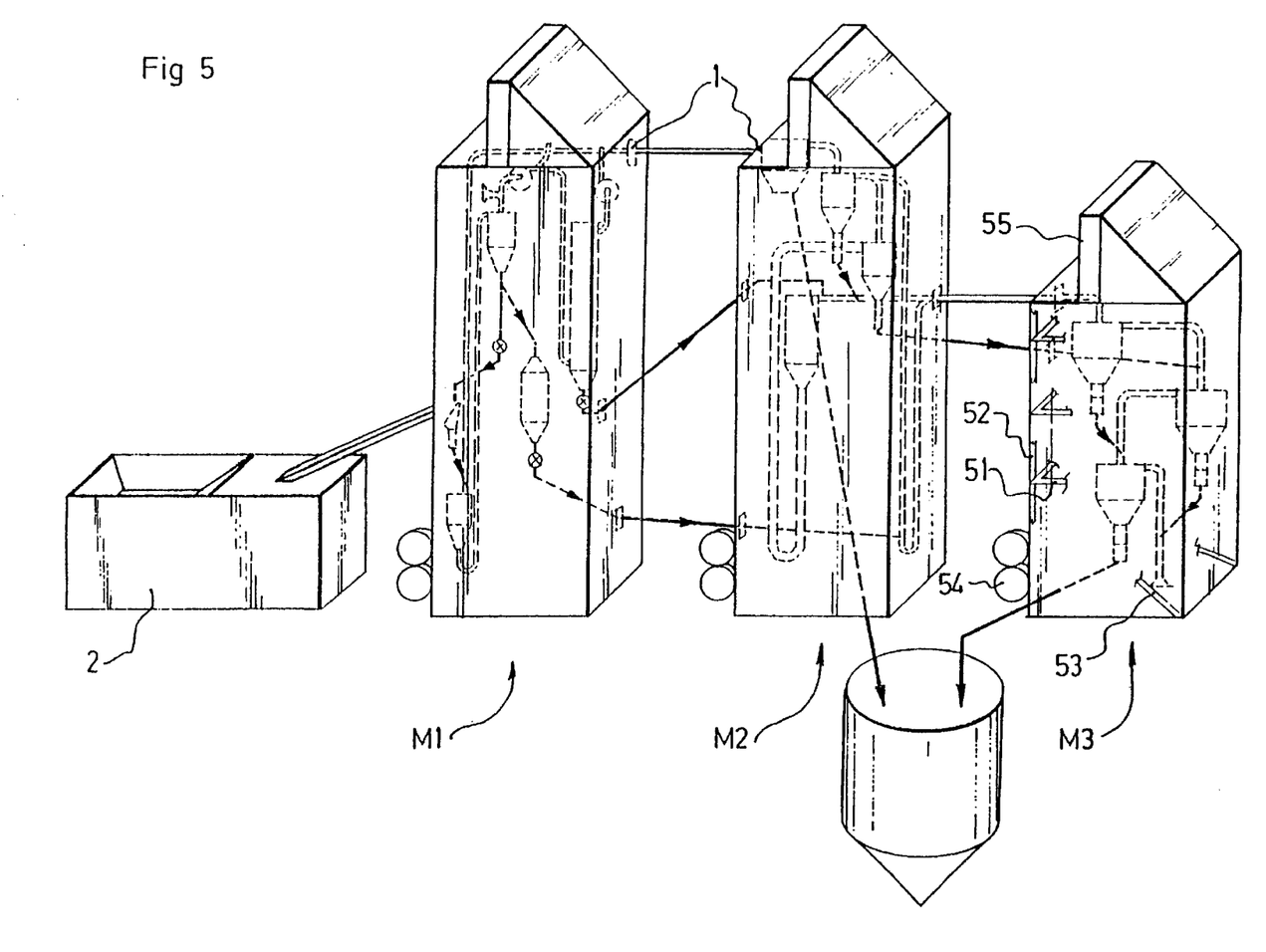
FIG. 5 is a diagrammatic view of the modules forming the said installation in the working configuration.
Figure 6:
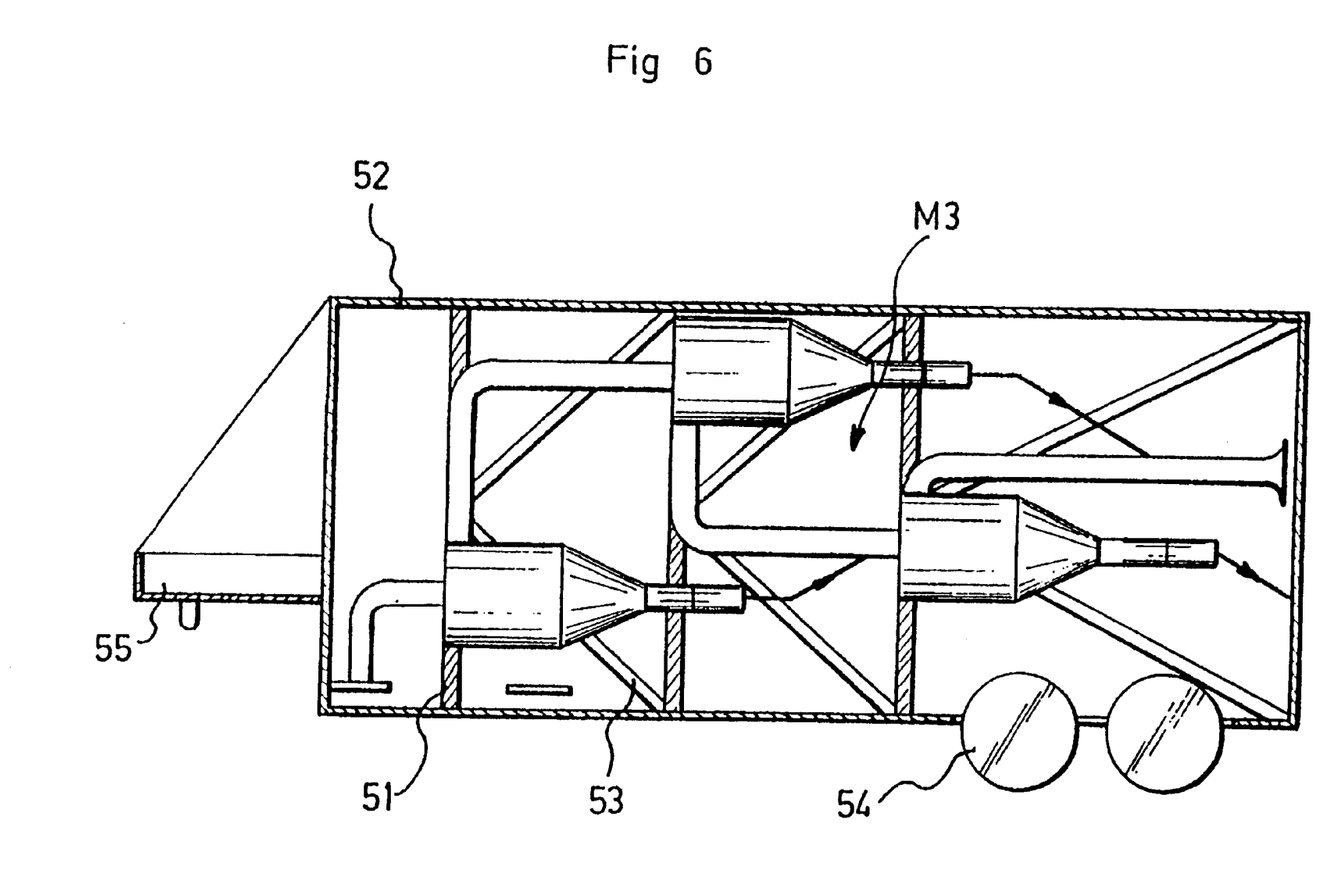
FIG. 6 is a diagrammatic view of one of these modules in a transport configuration.

The three modules M1, M2 and M3 can be separated as illustrated in FIGS. 5 and 6, and are functionally assembled in the working configuration, on the one hand, by systems of flanges such as 1 provided on the conduits and, on the other hand, as the case may be, by systems for attaching the chassis of the modules together.

The raw material, consisting for example of clods of clay-bearing earth gathered close to the construction site, is discharged by means of a conventional loader into a metering hopper 2 which feeds a belt conveyer 3, with a controlled material flow rate. These means for bringing in materials, discharge these into a hopper 4 provided with an outlet having a double airlock 5, making it possible to put the installation under reduced pressure by means of a fan 6 which ensures the circulation of gases in the entire installation. (In FIG. 1, the gas conduits are shown symbolically by double lines, whereas the conduits solely containing solid materials are represented by a thicker single line).

The raw materials fall by gravity at the outlet from the double air lock 5 into a hammer mill 7, traversed by hot gases arriving through a conduit 8. The mill 7 is fitted with a detachable mesh which enables the particle size of the materials to be adjusted at its outlet. These are then conveyed pneumatically in a conduit 9 which connects the outlet from the mill 7 to a cyclone-drier 10. The materials immersed in the flow of hot gases from the mill 7 undergo drying from the latter to the cyclone-drier 10. The relative humidity may be adjusted in the latter in particular to a value of less than 1% (by weight). The materials then fall by gravity into a buffer-silo 11. A recycling by-pass provided with a rotating airlock 12 makes it possible if required to return part of the materials to the hopper 4. It is thus possible to mix a given proportion of already ground and dried powdered materials in the hopper 4 so as to facilitate if necessary the drying and forming of the raw materials.

The buffer-silo 11 is equipped at its outlet with a rotating cellular airlock 13 which makes it possible to discharge the materials by gravity through a conduit 14 which emerges through an inlet 15 in the module M2. The rotating airlock 13 makes it possible to adjust the rate at which the materials arrive into the said module M2. The capacity of the buffer-silo 11 corresponds to 15 to 45 minutes of the production of the installation, which makes it possible, when put into operation, to start the mill 7 and the cyclone-dryer 10 with a time delay (when the gases arriving through the conduit 8 are at the appropriate temperature) and, when the installation stops, to interrupt the operation of the said means 7 and of the said cyclone-drier 10 with a delay (as long as the gases in the conduit 8 keep a sufficient temperature).

The materials are introduced into the module M2 inside a by-pass conduit 16 through which hot air passes. This air pneumatically conveys the materials to a preheating cyclone 17, while carrying out a first reheating of the said materials.

Preheated materials in the cyclone 17 leave this cyclone through a double swinging airlock 18 and are discharged by gravity, by means of a conduit 19, into a conduit 20 through which hot air passes. The double airlock 18 makes it possible to maintain the pressure difference established between the preheating cyclone 17 and the reheated air conduit 20.

The preheated materials are carried pneumatically in the conduit 20 by the reheated air to a combustion chamber 21 of the cylindro-conical type with a vertical axis, adapted so as to ensure flash calcination of the suspended materials in the flow of reheated air.

The combustion chamber 21 is extended at its base by a heat treatment tube 22 which receives the combustion fumes and the powdered materials carried by these fumes. This tube 22, in the form of a swan neck comprising a descending section 22a, an elbow 22c and an ascending section 22b, makes it possible to adjust the duration of the flash calcination from a few seconds to a few tens of seconds. Its length, which comprises between 5 and 15 meters, is adapted to the desired dwell time as a function of other parameters of the installation, (in particular the size of the combustion chamber).

The heat treatment tube 22 is connected to a cyclone-separator 23 which feeds, through a double swing airlock 24 and a conduit 25, the module M3 consisting of an assembly for cooling the materials. In a conventional manner, this assembly comprises several cooling cyclones, in this example three cyclones 26, 27 and 28 mounted in cascade. Each cyclone is equipped at its base with a double swinging airlock such as 29 which enables the materials to leave by gravity, while maintaining the established differential pressures. The materials pass successively into the cyclones 26, then 27, then 28, and are cooled during these passages by a principal airflow which passes through the cyclones in an inverse order.

The treated materials are conveyed at the outlet of the cyclone 28 through a conduit 30 to a storage silo (not shown in FIG. 1).

A principal air conduit 31 supplies the cyclone 28 of the cooling assembly with air. The materials coming from the cyclone 27 are introduced into this conduit with a view to transporting them pneumatically to the cyclone 28. The air then passes through the cyclone 27 and then the cyclone 26 and thus cools the materials, and is itself reheated.

At the outlet from the cooling module M3, the principal air thus reheated is conveyed by a conduit 32, on the one hand to the reheated air conduit 20 with a view to its admission into the combustion chamber 21, and on the other hand into the by-pass conduit 16 with a view to conveying and reheating the powdered materials introduced through the inlet 15.

The fumes containing the materials which leave the combustion chamber 21, circulate in the heat treatment tube 22, are separated from the solid materials in the separator 23 and are then conveyed into the reheating cyclone 17. The fume outlet 33 of the separator rejoins the by-pass conduit 16 and forms therewith a common conduit 34 connected to the hot gas inlet of the preheating cyclone 17. The gas outlet 35 from the latter is connected to a unit for recovering fines 36, in particular of the electrofilter type, which recovers the fine calcinated particles which have been carried through the outlet 35. The fines outlet 37 from this recovery unit rejoins the outlet 30 of the cooling module with a view to discharging the fines into the storage hopper for recovered calcined fines. In this way, the already treated materials are prevented from being recycled and from increasing the circulating charge.

The air outlet from the fines recovery unit 36 is connected by the conduit 8 to the grinder 7 so as to supply the latter with hot gases. The gases, after having passed through the grinder 7 and the cyclone-drier 10, are conveyed by the fan 6 to a dust removal unit 38 of the sleeve filter type, which removes the fines from them before discharging them to the atmosphere by the action of a fan 39. The dust removal unit 38 possesses a fines outlet 40 which is connected to the inlet of the combustion chamber 21 so as to recycle these untreated fines.

Upstream from the fan 6, a dilution fresh air inlet 41 makes it possible, where required, to reduce the temperature of the gases before they are introduced into the dust removal unit 38, so as to protect the filtration sleeves of the latter.

The flaps 42, 43 and 44 make it possible to establish adjustable pressure losses on the by-pass, 16, the principal air inlet 31 and the dilution air inlet 41 with a view to adjusting the air flows to suitable values. The flap 42 of the by-pass is placed upstream from the materials inlet 15 with a view to preventing any risk of abrasion or incorrect operation.

The system of flanges, such as 1, provided between the modules M1, M2 and M3 so that these can be assembled, are in the example mounted on the conduit 8, the conduit 14, the conduit 40, the conduit 25 and the conduit 32.

The installation according to the invention extends in the vertical direction between a lower level Ni and an upper level Ns separated by a height substantially less than in known flash calcining installations, by reason of the arrangement of the units and the circulations of materials and gases provided, associated with the pneumatic conveyance of materials from one functional unit to another. The reheated principal air outlet 32 from the cooling module and the outlet 33 from the separator are situated at an intermediate level. The by-pass conduit 16 includes a section 16a which descends to the lower level Ni and is connected close to this lower level at the materials inlet 15 and includes a section 16b which rises towards the fume outlet 33.

This by-pass conduit 16, as well as the heat treatment tube 22 and the conduit 9 of the supply module M1, include an elbow such as 45 between their descending section and an ascending section. The elbow of these tubes or conduits has the common characteristics described hereinafter with reference to FIGS. 2 and 3.

Figures 2, 3, 4:
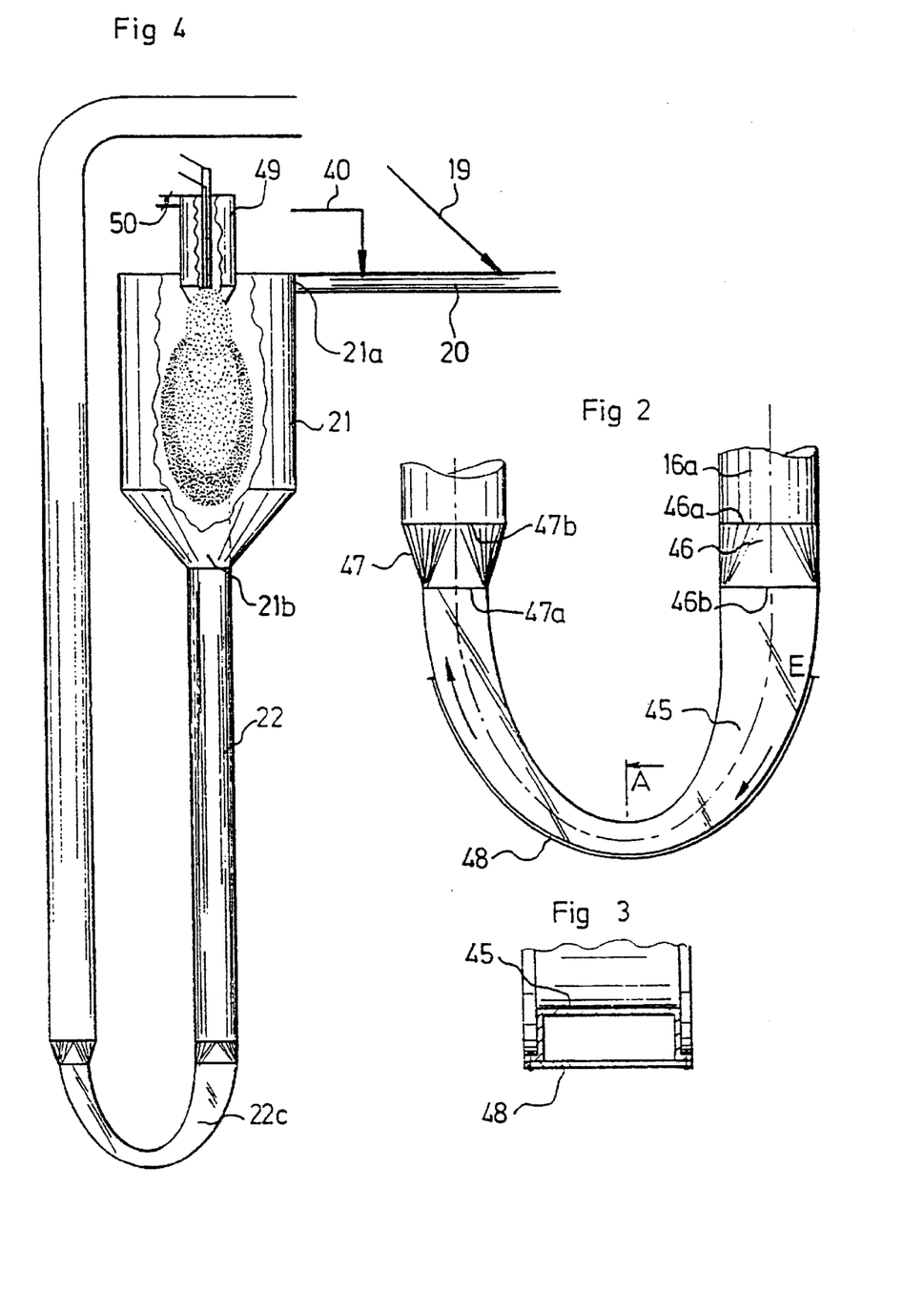
FIG. 2 is a detailed view and FIG. 3 is a section through a plane A.
FIG. 4 is a diagrammatic view of one of the assemblies.

The conduits of the installation are generally cylindrical and possess a circular cross section, As shown in FIG. 2, the descending section 16a of the conduit is connected to the elbow 45 by a section adapter 46 which has an outlet 46b with a rectangular cross section in which the circular cross section of its inlet 46a is inscribed. The elbow 45 has a rectangular cross section as shown diagrammatically in FIG. 3 and extends along a regular curve E in the form of a half-ellipse. The cross section of the elbow decreases as far as the lowest section A which is the minimum section, and then increases once again as far as a section adapter 47 having a rectangular inlet cross section 47a which is inscribed in the circular-shaped outlet cross section 47b.

These arrangements make it possible, by means of a venturi effect and a suitable trajectory for the particles, to prevent deposits and agglomerations of particles and to limit pressure losses. A detachable wear plate 48 forms the lower wall of the elbow either side of the minimum section. This bolted plate may be easily changed in case of wear.

FIG. 4 shows the combustion chamber 21 and its heat treatment tube 22. This chamber contains a domestic fuel oil burner 49 which receives, in a conventional manner, a flow of compressed air for spraying enabling the fuel to be vaporized, and a flow of primary air regulated by a flap 50. The flow of compressed air, the primary air flow and the principal flow (which arrives through the inlet 21a with the powdered materials) serve as a oxidizer. In the example, the inlet 21a is situated in the upper part of the chamber and is of the tangential type, forming a spiral of air loaded with materials around an axial calcining flame. The calcining chamber 21 is connected at its lower part to the heat treatment tube 22 by a frustoconical portion 21b.

The various constituent assemblies of the modules M1, M2, M3 are made of stainless steel in the absence of refractory materials (with the exception of the combustion chamber) which leads to a reduction in weight, in overall size and in the thermal inertia of the installation. Only the combustion chamber includes an internal refractory concrete lining secured to the walls by attachment projections which carry these and which are sunk in the concrete.

FIG. 5 shows the modules M1, M2, M3 of the installation diagrammatically in the operating position and FIG. 6 shows one of these modules (M3) in the transporting position.

Each module is provided with a frame formed of several platforms such as 51, of principle girders 52 and of struts 53 (FIG. 6). The chassis is provided with means for rolling movement such as 54 and a coupling system 55 to form a trailer.

In the position of rolling movement (FIG. 6), the constituent assemblies of the module lie on the trailer, their height being disposed in the longitudinal direction thereof. Lifting means (not shown) are associated with the said trailer with a view to raising it upright in the position of FIG. 5 so that its constituent assemblies assume normal operating positions, it then being possible to assemble their conduits so that they can operate. These conduits may be assembled by means of tubular sections assembled at their two ends onto the appropriate conduits of the installation using a system of flanges 1.

The installation may be moved in this way in relation to the location of the road construction site so that the crude clay-bearing earth extracted in the vicinity can be treated under the most economical conditions. The installation produces an activated clay rich in metakaolin which may be mixed with lime (60% activated clay, 40% lime) for incorporation in the soil to be stabilized.

What is claimed is:

1. An installation for carrying out the heat treatment of suspended powdered materials, in particular a flash calcination of mineral materials, comprising:

means (M1) for feeding in powdered materials, a device (17) for preheating the materials, provided with an inlet for hot gases (17a), an outlet for the preheated materials (18) and a gas outlet (35), a combustion chamber (21) containing at, least one burner (49) and provided with an inlet (21a) for introducing reheated air and preheated materials, and an outlet for fumes (21b) containing the materials after passage through the chamber, a separator (23) provided with an inlet receiving the fumes and powdered materials coming from the combustion chamber, a fume outlet (33) connected to the inlet for hot gases of the preheating device, and a materials outlet (24), an assembly (M3) for cooling the materials, provided with an inlet (25) for powdered materials coming from the separator, an inlet (31) for fresh air, so-called principal air, an outlet (30) for cooled materials and a reheated principal air outlet (32), at least two conduits (20, 16) connected to the reheated principal air outlet (32) of the cooling assembly with a view to dividing the reheated principal air into two flows, one referred to as reheated air and the other as diverted air, the reheated air conduit (20) being provided with an inlet (19) for materials connected to the preheated materials outlet (18) of the preheating device (17), with a view to introducing the said materials into the said conduit (20), and being connected to the reheated air inlet (21a) of the combustion chamber (21) with a view to injecting the said materials into the said combustion chamber, said installation extending vertically between a lower level (Ni) and an upper level (Ns), wherein the diverted air conduit, the so-called by-pass conduit (16), includes a section (16a) descending from the reheated principal air outlet (32) to the lower level (Ni) of the installation, and is connected to the means of supply (M1) by a powdered material inlet (15) in the vicinity of the said lower level (Ni) with a view to receiving the powdered materials, and includes a section (16b) rising towards the fume outlet (33) of the separator to form therewith a common conduit (34) connected to the hot gas inlet (17a) of the preheating device (17), with a view to providing pneumatic transport for the said powdered materials from the level Ni and a first heating of these upstream from the said preheating device.

2. The installation as claimed in claim 1, wherein the outlet for reheated principal air (32) of the cooling assembly (M3) as well as the fume outlet (33) of the separator (23) are situated at an intermediate level or close to the upper level Ns.

3. The installation as claimed in claim 1, wherein the by-pass conduit (16) includes, between its descending section (16a) and its ascending section (16b), an elbow (45) extending along a regular curve and having a minimum transverse section close to its lower part, said elbow (45) having a section progressively decreasing upstream from the said minimum section and a section increasing progressively downstream from the said minimum section.

4. The installation as claimed in claim 3, wherein the elbow (45) of the by-pass conduit (16) has a rectangular cross section with a lower wall consisting of a detachable wear plate (48) extending either side of the minimum section.

5. The installation as claimed in claim 1, wherein the by-pass conduit (16) includes, upstream from the materials inlet (15), a flap (42) adapted so as to establish an adjustable pressure loss inside said by-pass conduit.

6. The installation as claimed in claim 1, wherein the combustion chamber (21) is extended by a heat treatment tube (22) connected to the outlet from the said chamber to receive the fumes and powdered materials after passage through this, the said tube (22) having a length comprised between 5 and 15 meters adapted so as to provide the desired dwell time for the materials in the fumes and being connected at its terminal end to the inlet of the separator (23).

7. The installation as claimed in claim 6, wherein the heat treatment tube (22) has the form of a swan neck including, between a descending section (22a) and an ascending section (22b), an elbow (22c) extending along a regular curve and having a minimum cross section close to its lower part, the said elbow (22c) having a section which decreases progressively upstream from the said minimum section and a section which increases progressively downstream from the said minimum section.

8. Installation as claimed in claim 7, wherein the elbow (22c) of the heat treatment tube has a rectangular cross section with a lower wall consisting of a detachable wear plate extending either side of the minimum section.

9. The installation as claimed in claim 1, wherein the combustion chamber (21) is of the cylindro-conical type with a vertical axis, the reheated air inlet (21a) of the tangential type being situated in the upper part of the chamber, the preheated materials outlet (18) of the preheating device (17) being connected to the reheated air conduit (20) upstream from this tangential inlet (21a).

10. The installation as claimed in claim 1, wherein the means of supply (M1) include a grinder/drier (7, 10) adapted so as to deliver powdered materials with a particular particle size and degree of humidity and a buffer-silo (11) interposed between the outlet from the said grinder/drier and the materials inlet (15) introducing these into the by-pass conduit (16), the capacity of said buffer-silo (11) corresponding to at least 15 minutes of production by the installation.

11. The installation as claimed in claim 10, wherein the gas outlet (35) from the preheating device (17) is connected by a gas conduit (8) to the grinder/drier (7, 10) with a view to carrying out drying by means of the residual heat of the gases coming from said preheating device.

12. The installation as claimed in claim 11, wherein:

a dust removal unit (38) is associated with the grinder/drier (7, 10) with a view to recovering fines from the powdered materials, with a fines outlet (40) connected to the inlet of the combustion chamber (21), a fines recovery unit (36) is mounted on the aforementioned gas outlet (8), connected to the preheating device, with a fines outlet (37) connected to the outlet (30) of the cooling assembly (M3).

13. The installation as claimed in claim 1, wherein the cooling assembly (M3) includes several cooling cyclones (26, 27, 28) mounted in series and traversed in inverse order by the powdered materials and by the principal air.

14. The installation as claimed in claim 1, wherein the installation is divided into juxtaposed modules (M1, M2, M3) which are separable and which can be assembled, each of said modules being provided with a frame (51, 52, 53) forming a trailer provided with means of rolling motion (54).

15. The installation as claimed in claim 14, wherein each module (M1, M2, M3) is arranged on its trailer so that the constituent assemblies of the said module lie on the said trailer, their height being disposed in the longitudinal direction thereof, lifting means being associated with the said trailer with a view to raising it upright so that its constituent assemblies assume normal operating positions.

16. The installation as claimed in claim 14, wherein the constituent assemblies of the modules are made of stainless steel in the absence of refractory materials, with the exception of the combustion chamber which has an inner refractory lining secured to the steel.

17. A process for stabilizing a soil on a construction site, in particular a road construction site, wherein natural crude clay-bearing earths are extracted close to said site, said earths are calcined by means of an installation as claimed in claim 1 with a view to obtaining an activated clay-bearing material and the said activated clay-bearing material is incorporated in the soil in a mixture with lime and water under conditions suitable for producing hydraulic setting.

* * * * *